US008930475B1

(12) United States Patent
North et al.

(10) Patent No.: US 8,930,475 B1
(45) Date of Patent: Jan. 6, 2015

(54) SYSTEMS AND METHODS FOR SECURE CLOUD-BASED MEDIA FILE SHARING

(75) Inventors: Dave North, Orleans (CA); Tony Vasile, Ottawa (CA); Richard C. Clarkson, Westborough, MA (US)

(73) Assignee: Signiant Inc., Burlington, MA (US)

(*) Notice: Subject to any disclaimer, the term of this patent is extended or adjusted under 35 U.S.C. 154(b) by 205 days.

(21) Appl. No.: 13/436,216

(22) Filed: Mar. 30, 2012

(51) Int. Cl.
*G06F 15/16* (2006.01)

(52) U.S. Cl.
USPC ............................................. 709/206

(58) Field of Classification Search
CPC .............. H04L 63/105; G06F 17/30893
USPC .............................................. 709/206
See application file for complete search history.

(56) References Cited

U.S. PATENT DOCUMENTS

| 5,319,644 | A | 6/1994 | Liang ............................ 370/85.5 |
| 5,519,863 | A | 5/1996 | Allen et al. .................... 395/650 |
| 5,552,776 | A | 9/1996 | Wade et al. ............... 340/825.31 |
| 5,737,495 | A | 4/1998 | Adams et al. ................. 395/615 |
| 5,796,966 | A | 8/1998 | Simcoe et al. ................ 395/311 |
| 5,999,979 | A | 12/1999 | Vellanki et al. ............... 709/232 |
| 6,006,019 | A | 12/1999 | Takei ......................... 395/200.54 |
| 6,064,656 | A | 5/2000 | Angal et al. .................... 370/254 |
| 6,085,251 | A | 7/2000 | Fabozzi, II .................... 709/230 |
| 6,128,653 | A | 10/2000 | del Val et al. ................. 709/219 |
| 6,163,543 | A | 12/2000 | Chin et al. .................... 370/400 |
| 6,163,809 | A | 12/2000 | Buckley ....................... 709/237 |
| 6,192,412 | B1 | 2/2001 | Cantoral et al. .............. 709/236 |
| 6,199,109 | B1 | 3/2001 | Reder et al. ................... 709/224 |
| 6,219,706 | B1 | 4/2001 | Fan et al. ....................... 709/225 |
| 6,298,061 | B1 | 10/2001 | Chin et al. .................... 370/400 |
| 6,396,511 | B1 | 5/2002 | Karino ......................... 345/744 |
| 6,405,256 | B1 | 6/2002 | Lin et al. ....................... 709/231 |
| 6,438,598 | B1 | 8/2002 | Pedersen ...................... 709/227 |
| 6,463,465 | B1 | 10/2002 | Nieuwejaar ................... 709/217 |
| 6,557,122 | B1 | 4/2003 | Sugauchi et al. ............... 714/57 |
| 6,600,812 | B1 | 7/2003 | Gentillin et al. ................ 379/45 |
| 6,701,437 | B1 | 3/2004 | Hoke et al. .................... 713/201 |
| 6,718,361 | B1 | 4/2004 | Basani et al. ................. 709/201 |
| 6,742,023 | B1 | 5/2004 | Fanning et al. ............... 709/219 |
| 6,760,861 | B2 | 7/2004 | Fukuhara et al. ................ 714/4 |
| 6,763,384 | B1 | 7/2004 | Gupta et al. ................... 709/224 |
| 6,823,373 | B1 | 11/2004 | Pancha et al. ................. 709/219 |
| 6,859,835 | B1 | 2/2005 | Hipp ............................. 709/227 |

(Continued)

FOREIGN PATENT DOCUMENTS

WO   WO 2006/019490   2/2006

OTHER PUBLICATIONS

SmartFTP (May 16, 2007, smartftp.com).*
Direct Client to Client (Feb. 19, 2010, wikipedia.org).*

(Continued)

*Primary Examiner* — Michael Won
*Assistant Examiner* — Nicholas Celani
(74) *Attorney, Agent, or Firm* — Pillsbury Winthrop Shaw Pittman LLP

(57) ABSTRACT

Cloud-based systems and methods to securely share electronic files use a cloud or virtualized server to handle management tasks related to file sharing, while file storage is maintained securely by servers that are not part of the cloud. The content of the file to be shared is not transmitted to or by the cloud. Share requests from file senders, notifications to target recipients, and retrieve requests from target recipients are transmitted to and/or by the cloud.

34 Claims, 6 Drawing Sheets

(56) References Cited

U.S. PATENT DOCUMENTS

| | | | |
|---|---|---|---|
| 6,925,495 B2 | 8/2005 | Hegde et al. | 709/223 |
| 6,976,095 B1 | 12/2005 | Wolrich et al. | 709/250 |
| 6,996,631 B1 | 2/2006 | Aiken, Jr. et al. | 709/242 |
| 7,051,365 B1 | 5/2006 | Bellovin | 726/11 |
| 7,054,935 B2 * | 5/2006 | Farber et al. | 709/226 |
| 7,103,889 B2 | 9/2006 | Hiltgen | 719/317 |
| 7,113,963 B1 | 9/2006 | McCaw | 707/204 |
| 7,139,805 B2 | 11/2006 | Seagren et al. | 709/207 |
| 7,139,811 B2 | 11/2006 | Lev Ran et al. | 709/217 |
| 7,152,105 B2 | 12/2006 | McClure et al. | 709/224 |
| 7,152,108 B1 | 12/2006 | Khan et al. | 709/225 |
| 7,177,897 B2 | 2/2007 | Manukyan | 709/200 |
| 7,257,630 B2 | 8/2007 | Cole et al. | 709/224 |
| 7,308,710 B2 | 12/2007 | Yarborough | 726/11 |
| 7,343,301 B1 | 3/2008 | Nash et al. | 705/1 |
| 7,403,934 B2 | 7/2008 | Polizzi | 707/1 |
| 7,406,533 B2 | 7/2008 | Li et al. | 709/236 |
| 7,447,775 B1 | 11/2008 | Zhu et al. | 709/226 |
| 7,461,067 B2 | 12/2008 | Dewing et al. | 707/10 |
| 7,478,146 B2 | 1/2009 | Tervo et al. | 709/220 |
| 7,526,557 B2 | 4/2009 | Bowler | 709/227 |
| 7,552,192 B2 | 6/2009 | Carmichael | 709/217 |
| 7,606,562 B2 | 10/2009 | Aaltonen et al. | 455/414.1 |
| 7,676,675 B2 | 3/2010 | Billharz et al. | 713/168 |
| 7,707,271 B2 | 4/2010 | Rudkin et al. | 709/218 |
| 7,716,312 B2 | 5/2010 | Gamble | 709/223 |
| 8,081,956 B2 | 12/2011 | Aaltonen et al. | 455/414.1 |
| 8,667,145 B2 | 3/2014 | Bowler | 709/227 |
| 2002/0032769 A1 | 3/2002 | Barkai et al. | 709/224 |
| 2002/0049834 A1 | 4/2002 | Molnar | 709/219 |
| 2002/0077909 A1 | 6/2002 | Kanojia et al. | 705/14 |
| 2002/0099729 A1 | 7/2002 | Chandrasekaran et al. | 707/203 |
| 2002/0104008 A1 | 8/2002 | Cochran et al. | 713/200 |
| 2002/0116485 A1 | 8/2002 | Black et al. | 709/223 |
| 2002/0116616 A1 | 8/2002 | Mi et al. | 713/168 |
| 2002/0165961 A1 | 11/2002 | Everdell et al. | 709/225 |
| 2002/0169694 A1 | 11/2002 | Stone et al. | 705/27 |
| 2002/0199000 A1 | 12/2002 | Banerjee | 709/227 |
| 2003/0014482 A1 | 1/2003 | Toyota et al. | 709/203 |
| 2003/0028495 A1 | 2/2003 | Pallante | 705/78 |
| 2003/0028647 A1 | 2/2003 | Grosu | 709/227 |
| 2003/0046103 A1 | 3/2003 | Amato et al. | 705/1 |
| 2003/0051026 A1 | 3/2003 | Carter et al. | 709/224 |
| 2003/0056096 A1 | 3/2003 | Albert et al. | 713/168 |
| 2003/0065950 A1 | 4/2003 | Yarborough | 713/201 |
| 2003/0088694 A1 | 5/2003 | Patek et al. | 709/238 |
| 2003/0105830 A1 | 6/2003 | Pham et al. | 709/216 |
| 2003/0115302 A1 | 6/2003 | Teraoaka et al. | 709/221 |
| 2003/0115361 A1 | 6/2003 | Kirk et al. | 709/244 |
| 2003/0120822 A1 | 6/2003 | Langrind et al. | 709/251 |
| 2003/0126195 A1 | 7/2003 | Reynolds et al. | 709/203 |
| 2003/0212806 A1 | 11/2003 | Mowers et al. | 709/229 |
| 2003/0216958 A1 | 11/2003 | Register et al. | 705/14 |
| 2003/0221014 A1 | 11/2003 | Kosiba et al. | 709/231 |
| 2004/0003152 A1 | 1/2004 | Fussell et al. | 710/100 |
| 2004/0015728 A1 | 1/2004 | Cole et al. | 713/201 |
| 2004/0049550 A1 | 3/2004 | Yu | 709/208 |
| 2004/0073681 A1 | 4/2004 | Fald | 709/227 |
| 2004/0093420 A1 | 5/2004 | Gamble | 709/231 |
| 2004/0122888 A1 | 6/2004 | Carmichael | 709/200 |
| 2004/0139212 A1 | 7/2004 | Mukherjee et al. | 709/230 |
| 2004/0254914 A1 | 12/2004 | Polizzi | 707/3 |
| 2005/0044250 A1 | 2/2005 | Gay et al. | 709/230 |
| 2005/0086359 A1 | 4/2005 | Banerjee et al. | 709/232 |
| 2005/0086533 A1 | 4/2005 | Hsieh | 713/201 |
| 2005/0251575 A1 | 11/2005 | Bayardo et al. | 709/227 |
| 2005/0261796 A1 | 11/2005 | Shen | 700/121 |
| 2006/0015580 A1 | 1/2006 | Gabriel et al. | 709/219 |
| 2007/0130143 A1 * | 6/2007 | Zhang et al. | 707/8 |
| 2007/0185902 A1 | 8/2007 | Messinger et al. | 707/103 R |
| 2008/0250028 A1 | 10/2008 | Rutherglen et al. | 707/10 |
| 2008/0319760 A1 * | 12/2008 | Da Palma et al. | 704/270.1 |
| 2009/0037520 A1 * | 2/2009 | Loffredo | 709/203 |
| 2009/0138477 A1 | 5/2009 | Piira et al. | 707/10 |
| 2009/0164283 A1 | 6/2009 | Coley | 705/7 |
| 2010/0122180 A1 * | 5/2010 | Kamiyama et al. | 715/744 |
| 2010/0205261 A1 | 8/2010 | Michel | 709/206 |
| 2010/0293147 A1 * | 11/2010 | Snow et al. | 707/640 |
| 2011/0009991 A1 | 1/2011 | Dinicola et al. | 700/97 |
| 2011/0022642 A1 | 1/2011 | deMilo et al. | 707/805 |
| 2011/0225270 A1 | 9/2011 | Taniguchi et al. | 709/219 |
| 2014/0032503 A1 | 1/2014 | Nash et al. | 707/687 |

OTHER PUBLICATIONS

Waldrop, Clarence, et al., "Making a TCP/IP Connection Through a Firewall", Candle Advanced Technical Corner Tips and Tricks, copyright 2003, 7 pages.

Premo, Rita, "A Picture-Perfect Travel Log; Working Wise; Avaya Inc.; Brief Article", Aug. 1, 2002, *Security Management*, No. 8, vol. 46, p. 25, ISSN: 0145-9406, pp. 1-3.

"ISOCOR Releases Industry's Most Powerful Message Server", Nov. 14, 1994, *M2 Presswire*, pp. 1-3.

* cited by examiner

SYSTEMS AND METHODS FOR SECURE CLOUD-BASED MEDIA FILE SHARING

FIELD

The disclosure relates to cloud-based systems and methods for electronic file sharing, and, in particular, securely sharing media files.

BACKGROUND

Peer-to-peer electronic file sharing over a public network is known. Some peer-to-peer networks use prolific copying of files to enable distributed file sharing. For some types of data and/or some types of digital industries, such a distributed approach may not be sufficiently secure. Bi-directional file synchronization over a public network is known. Some file-synchronization services use cloud storage for electronic files. For some types of data and/or some types of digital industries, a file-synchronization approach may not be sufficiently secure. Secure file sharing, for example through encryption, authorization, password protection, etc., may be known.

SUMMARY

One aspect of the disclosure relates to cloud-based systems configured to securely share and/or transfer electronic files. The system may include multiple processors in a plurality of server platforms cooperating to implement a virtualized server. The plurality of server platforms collectively and/or the virtualized server individually may be referred to as a (computing) cloud. The virtualized server may include computer program modules that manage and organize secure file sharing and/or file transfer. For the purposes of this disclosure, "sharing" one or more electronic files may include one or more users sharing access to the same one or more electronic files, one or more users sharing access to one or more copies of one or more electronic files, one or more users transferring and/or transmitting one or more electronic files to one or more users, and/or one or more users transferring and/or transmitting one or more copies of one or more electronic files to one or more users.

The electronic files shared by virtue of secure file sharing as described herein may not actually be stored, received, and/or and transmitted by the virtualized server or the plurality of server platforms. That is, cloud storage may not be implemented for the shared electronic files. One or more separate storage servers that are managed and accessed independently from the virtualized server may be used to store the electronic files. The one or more separate storage servers may include one or more private (storage) servers. The one or more private (storage) servers may use one or more levels and/or types of access control. The content of the electronic files may be managed, accessed, and/or stored securely through the one or more storage servers.

The virtualized server may be deployed using a public network and/or using commercial web services. The public network and/or the commercial web services may neither store, receive, nor transmit (copies of) the electronic files being shared. The virtualized server may have access to some information related to the electronic files, including one or more of file names, storage locations, access rights information, format and/or file-type information, file size information, and/or other meta-information related to the one or more electronic files.

The virtualized server may include computer program modules. The computer program modules may include a user module, a share request module, a cloud identifier module, a notification module, a retrieve request module, a transfer instruction module, and/or other modules.

The user module may be configured to identify, authenticate, and/or authorize users and/or user accounts of users within the system. Individual user accounts may be associated with individual users. In some implementations, individual users and/or individual user accounts may be associated with individual private (storage) servers.

The share request module may be configured to receive share requests at the virtualized server from client computing platforms associated with users. Share requests may indicate intent by users to share electronic files with other users. The share requests may include a first share request. A share request may pertain to one or more electronic files that are intended to be shared. A share request may pertain to one or more other users that are intended to receive access to the one or more electronic files. The users on behalf of whom the share requests may be received may be referred to as senders. The senders may include a first user. The client computing platforms from which the share requests may be received may include a first client computing platform. The electronic files that may be intended to be shared by a specific sender such as the first user may include a first electronic file. The first client computing platform may be associated with a specific sender such as the first user. The first user may indicate, through the first share request, intent to share the first electronic file with one or more other users. A share request may include one or more file identifiers, storage identifiers, user identifiers, and/or other information.

File identifiers may identify electronic files stored using electronic storage. The electronic storage may be identified by storage identifiers. The file identifiers may include a particular file identifier. A particular file identifier may include and/or be based on a file name and/or a directory path associated with a file location of a particular electronic file, and/or other information that may be used to identify and/or locate a particular electronic file. Storage identifiers may include one or more storage server names and/or locations, names of a storage device and/or location, locations of electronic storage, and/or other information that may be used to identify electronic storage of electronic files. User identifiers may identify one or more target file recipients for one or more electronic files. A target file recipient may be referred to as a prospective receiver (or "receiver" for short). The one or more target file recipients may include a specific target file recipient such as a first receiver. The first user may intend to share the first electronic files with the first receiver. Any of the identifiers used in the share request may use an encoded, encrypted, scrambled, hashed, and/or otherwise processed version of the contained information as long as the corresponding reverse operation is available to retrieve the contained information in a usable form.

Electronic storage, such as the electronic storage identified by the storage identifiers included in the share requests, may be managed and accessed independently from the virtualized server. That is, the virtualized server may neither store, receive, nor transmit electronic files or copies thereof.

The cloud identifier module of the virtualized server may be configured to assign, create, and/or generate cloud identifiers. Cloud identifiers may identify electronic files. Cloud identifiers may include alphanumeric characters. The cloud identifiers may include a first cloud identifier. The first cloud identifier may identify the first electronic file. Cloud identifiers may be based on one or more file identifiers, for example, without limitation, through a hash function. Cloud identifiers may be based on both of one or more file identifiers and one or more storage identifiers. Cloud identifiers may be based on one or more file identifiers, storage identifiers, target file recipients, senders, receivers, and/or user identifiers, such as any identifiers included in share requests. Information related to a particular share request may be identified by a particular intermediary identifier. Cloud identifiers may not include a file name (in unencrypted or readily readable form). Such particular intermediary identifiers may be assigned, created, and/or generated by the cloud identifier module. Cloud identifiers may relate to, be based on, or be similar to such particular intermediary identifiers.

The cloud identifier module of the virtualized server may be configured to store associations between cloud identifiers and one or more file identifiers, storage identifiers, target file recipients, and/or user identifiers. An individual association between an individual cloud identifier and one or more identifiers included in an individual share request may be stored by the cloud identifier module for verification and/or other purposes described elsewhere herein.

The notification module of the virtualized server may be configured to provide notifications to receivers. Notifications may indicate intent by senders to share electronic files with receivers. Notifications may include cloud identifiers from the cloud identifier module. The notifications may include a first notification. The first notification may include the first cloud identifier. Provision of notifications may be implemented by electronic mail messages to (email) addresses that may be associated with the receivers. Electronic messages may include (universal) resource locators, links, and/or other information that may be usable by the virtualized server to identify particular electronic files. Such resource locators, links, and/or other information may provide receivers with direct or indirect access, via the virtualized server, to the particular electronic files. The first notification may indicate intent by a specific sender such as the first user to share the first electronic file, as identified by the first cloud identifier, with the first receiver.

The retrieve request module of the virtualized server may be configured to receive retrieve requests from target computing platforms associated with receivers. Retrieve requests may indicate intent by receivers to receive (copies of) particular electronic files, and/or obtain access thereto. Retrieve requests may include cloud identifiers from the cloud identifier module. Cloud identifiers may identify particular electronic files. The retrieve requests may include a first retrieve request associated with the first receiver. The first retrieve request may include the first cloud identifier.

The virtualized server may be configured to verify whether receivers match intended target recipients as included in share requests. Verification may be based on the stored associations as described in relation to the cloud identifier module. The virtualized server may verify whether the first receiver, who may be associated with the first retrieve request, matches the target file recipient of the first share request. Verification of a first receiver may be based on an individual association between the first cloud identifier, as included in the first retrieve request, and the target file recipient of the first share request. Individual associations may be stored by the cloud identifier module, as described elsewhere herein. In other words, a particular user who is not the target file recipient may not be able to use a particular notification provided to the target file recipient, and/or access the electronic file that corresponds to the cloud identifier in the particular notification.

The transfer instruction module may be configured to transmit instructions that cause retrieval of (copies of) electronic files. Operation of the transfer instruction module may be responsive to receipt of retrieve requests from receivers. Operation of the transfer instruction module may be responsive to verification that the receivers match the intended target file recipients as included in share requests. The electronic files to be retrieved may be identified by cloud identifiers. Electronic files (and/or copies thereof) may be retrieved from electronic storage. The electronic storage may be identified by storage identifiers that may be included in share requests and/or that may correspond to cloud identifiers included in retrieve requests. The content of the electronic files may be neither stored, received, nor transmitted by the virtualized server. The electronic files may include the first electronic file. The retrieval of the first electronic file may be responsive to receipt of the first retrieve request from the target computing platform associated with the first receiver. The retrieval of the first electronic file may be responsive to verification whether the first receiver matches the intended target file recipient of the first share request. Such verification may be based on an individual association stored by the cloud identifier module, as described elsewhere herein.

The transfer instruction module may be configured to transmit instructions to one or more client computing platforms (from which share requests may have been received), electronic storage (may have been used to store electronic files), target computing platforms (from which retrieve requests may have been received), storage servers that may be configured to manage and access the electronic storage that may be used to store electronic files independently from the virtualized server, and/or other components of the system, of the virtualized server, and/or external components. The external components may be communicatively coupled to the system such that receivers may access transmitted copies of electronic files, e.g. through target computing platforms.

One aspect of the disclosure relates to cloud-based methods to securely share electronic files.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying figures, all of which form a part of this specification, wherein like reference numerals designate corresponding parts in the various figures. It is to be expressly understood, however, that the figures are for the purpose of illustration and description only and are not intended as a definition of any limits. As used in the specification and in the claims, the singular form of "a", "an", and "the" include plural referents unless the context clearly dictates otherwise.

DETAILED DESCRIPTION

Figure 1:
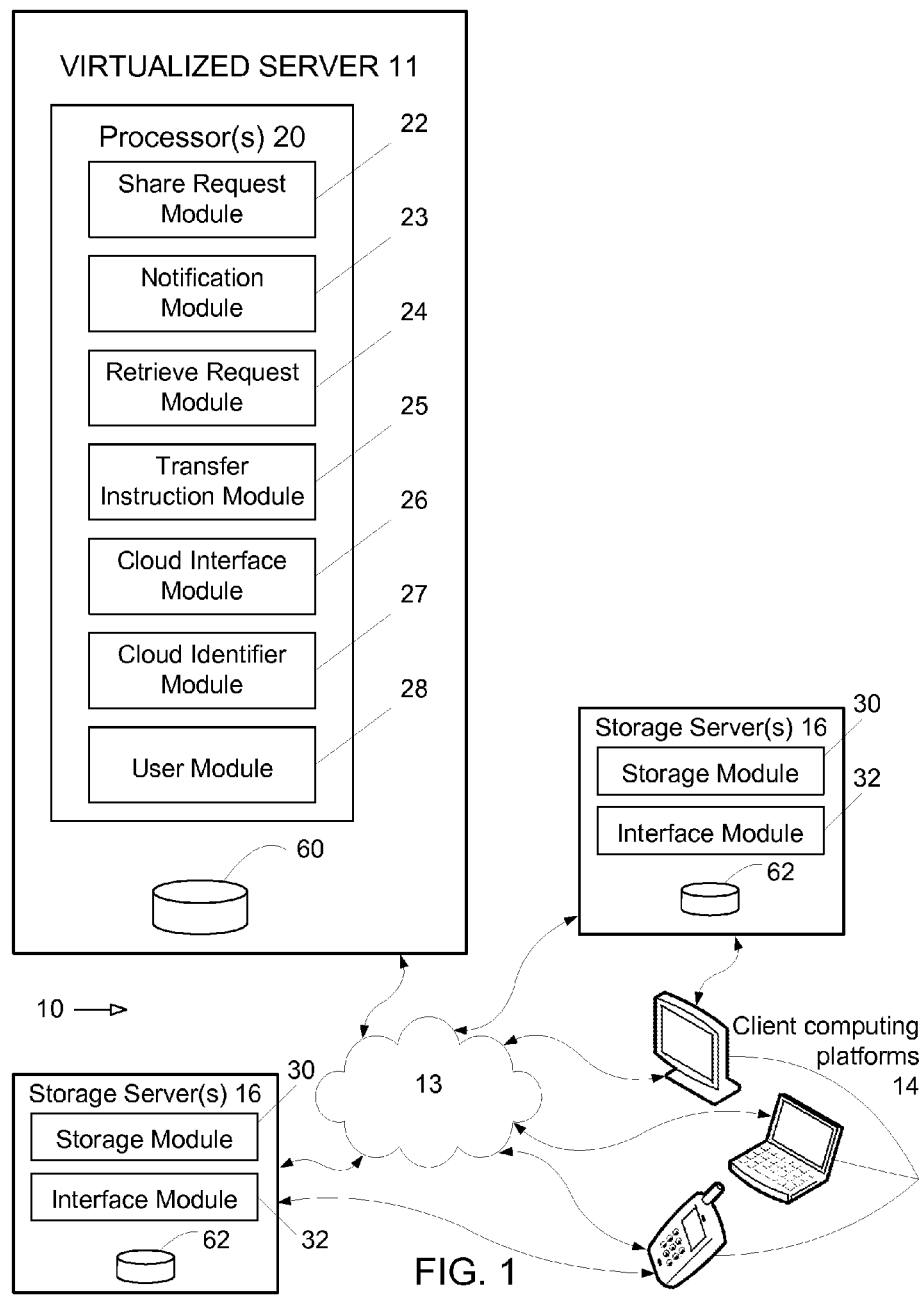
FIG. 1 illustrates a cloud-based system configured to securely share electronic files in accordance with one or more implementations.

FIG. 1 illustrates a cloud-based system 10 configured to securely share electronic files. One or more processors 20 may be included in a plurality of server platforms cooperating to implement a virtualized server 11, which may be referred to as (computing) cloud 11. Virtualized server 11 may operate as a (computing) cloud offering web services.

System 10 may include virtualized server 11, one or more client computing platforms 14, one or more storage servers 16, electronic storage 60, and/or other components. The electronic files shared by virtue of secure file sharing as described herein may not actually be stored, received, and/or transmitted by virtualized server 11, nor by electronic storage 60, nor in cloud storage. The components in FIG. 1 may be communicatively coupled through one or more networks 13, including but not limited to the Internet.

Virtualized server 11 may include computer program modules. The computer program modules may include a share request module 22, a cloud identifier module 27, a notification module 23, a retrieve request module 24, a transfer instruction module 25, a cloud interface module 26, a user module 28, and/or other modules.

Virtualized server 11 may be deployed using a public network such as, by way of non-limiting example, the Internet, and/or using commercial web services hosted by a third party such as, by way of non-limiting example, Amazon Web Services™ hosted by Amazon™, or Microsoft Azure™ hosted by Microsoft™. Server platforms, processors, and/or other components of virtualized server 11 may be associated with a web services provider and/or hosted by a third party.

Share request module 22 of virtualized server 11 may be configured to receive share requests at virtualized server 11 from client computing platforms 14 associated with users. For example, a first share request may indicate intent by a sender to share a first electronic file with a first receiver. The first share request may be received from a client computing platform 14 that may be associated with the sender. The client computing platform that is associated with the sender may be referred to as sender computing platform 14. The first share request may include one or more of a first file identifier, a first storage identifier, a first user identifier, and/or other information. Two or more of the first file identifier, the first storage identifier, the first user identifier, and/or other identification information may be combined in an aggregate identifier included in the first share request. In some implementations, share requests may pertain to electronic files that may be stored on client computing platforms 14. Such share requests may imply a request to upload and/or store one or more electronic files on a particular storage server 16, e.g. for future secure file sharing as described herein. Communication between client computing platforms and virtualized server 11 may be based on a representational state transfer (REST) architecture.

The first file identifier may identify the first electronic file. The first electronic file may be stored using electronic storage. The electronic storage may be identified by the first storage identifier. For example, the first file identifier may include the file name and/or directory path of the first electronic file. The first storage identifier may include the name and/or location of the specific storage server 16 where the first electronic file is and/or will be stored. In some implementations, individual ones of the users and/or the user accounts may be associated with individual ones of the storage servers 16, which may obviate the need to explicitly include a storage identifier with a share request. Share requests pertaining to electronic files that may be stored on client computing platforms 14 may not include a storage identifier. The first user identifier may identify the first receiver. The first receiver may be referred to as the first target file recipient.

Cloud identifier module 27 of virtualized server 11 may be configured to associate cloud identifiers with electronic files to be shared through system 10. Cloud identifier module 27 may be configured to generate, obtain, create, assign, and/or provide other functionality included in making these associations between electronic files and cloud identifiers. Individual cloud identifiers may identify the associated individual electronic files to be shared. For example, a first cloud identifier associated with the first electronic file may identify the first electronic file. Cloud identifier module 27 may be configured to generate the first cloud identifier based on one or more of the first file identifier, the first storage identifier or prospective storage identifier where the electronic files will be stored, the first user identifier, and/or other identifiers such as may be included in and/or related to the first share request.

Cloud identifier module 27 of virtualized server 11 may be configured to store associations between cloud identifiers and one or more file identifiers, storage identifiers, target file recipients, and/or user identifiers. For example, cloud identifier module 27 may store a first association between the first cloud identifier and one or more identifiers included in and/or related to the first share request. Stored associations may be used to verify whether prospective receivers match intended target file recipients during secure file sharing. For example, a particular user who is not the target file recipient related to a particular share request may not be able to retrieve and/or access the electronic file that corresponds to the cloud identifier that is associated with that particular share request.

Notification module 23 of virtualized server 11 may be configured to provide notifications to receivers. Notifications may indicate intent by senders to share electronic files with receivers. In some implementations, a client computing platform 14 may be associated with the first receiver. This client computing platform 14 may be referred to as the receiver computing platform 14, the target file recipient computing platform 14, and/or the target computing platform 14.

A first notification provided by notification module 23 may include the first cloud identifier. The first notification may be implemented as a first electronic mail message to the first receiver. The first electronic mail message may include a first universal resource locator (URL). The first universal resource locator may be referred to as the first link. The first receiver may use the first link when establishing communication with virtualized server 11, and/or after communication with virtualized server 11 has been established. Responsive to establishing communication with virtualized server 11 and using the first link, virtualized server 11 and/or target computing platform 14 may be configured to generate and/or present a graphical user interface to the first receiver. Such a graphical user interface may be referred to as a landing page. In some implementations, graphical user interfaces may be generated and/or presented by cloud interface module 26. For example, the first receiver may cause a retrieve request to be received at virtualized server 11 through a graphical user interface. An example of such a graphical user interface is described elsewhere herein in relation to FIG. 3.

Referring to FIG. 1, retrieve request module 24 of virtualized server 11 may be configured to receive retrieve requests, e.g. from target computing platforms associated with receivers. Retrieve requests may indicate intent by receivers to receive (copies of) particular electronic files, and/or obtain access thereto. For example, a first retrieve request from the first receiver may include the first cloud identifier identifying the first electronic file. In some implementations, a particular selection, activation, and/or confirmation within a graphical user interface may cause, send, and/or transmit the first retrieve request such that the first retrieve request is received at virtualized server 11. As described above, such a graphical user interface may be generated and/or presented by cloud interface module 26.

Transfer instruction module 25 of virtualized server 11 may be configured to transmit instructions that cause retrieval of (copies of) electronic files. Operation of the transfer instruction module may be responsive to receipt of retrieve requests from receivers. Operation of the transfer instruction module may be responsive to verification, e.g. by cloud identifier module 27, that the receivers match the intended target file recipients as included in share requests. For example, the first electronic file (to be retrieved from electronic storage identified by the first storage identifier included in the first share request) may be identified by the first cloud identifier. The retrieval of the first electronic file may be responsive to verification whether the first receiver matches the intended target file recipient of the first share request. Such verification may be based on an individual association stored by cloud identifier module 27, as described elsewhere herein. In other words, a particular receiver who is not the target file recipient may not be able to use a particular notification provided to the target file recipient, and/or access the electronic file that corresponds to the cloud identifier in the particular notification.

Transfer instruction module 25 of virtualized server 11 may be configured to transmit instructions to one or more client computing platforms 14 (e.g. sender computing platform 14 from which share requests may have been received), target computing platforms 14 (from which retrieve requests may have been received), storage servers 16 (e.g. private servers that may be configured to manage and access electronic storage used to store electronic files independently from virtualized server 11), and/or other components of system 11, of virtualized server 11, and/or external components. The external components may be communicatively coupled to system 10 such that receivers may access transmitted copies of electronic files, e.g. through one or more target computing platforms 14.

In some implementations, share requests may pertain to electronic files that may be stored on client computing platforms 14. In such cases, transfer instruction module 25 of virtualized server 11 may be configured to transmit instructions that cause storage and/or uploading of electronic files on storage servers 16. Transfer instruction module 25 of virtualized server 11 may be configured to transmit instructions to one or more client computing platforms 14 (e.g. sender computing platform 14 from which share requests may have been received), storage servers 16 (e.g. private servers that may be configured to manage and access electronic storage used to store electronic files independently from virtualized server 11, in particular a storage server 16 that may be associated with the sender and/or the user account of the sender), and/or other components of system 11, of virtualized server 11.

User module 28 may be configured to identify, authenticate, and/or authorize users and/or user accounts of users within system 10. Individual user accounts may be associated with individual users. Individual users and/or individual user accounts may be associated with individual private servers and/or storage servers 16. This association may obviate the need for senders and/or receivers to supply and/or select storage identifiers during use of system 10. User accounts may include access permissions to one or more electronic files. Access permission may include view, edit, and/or other types of permissions. Access permissions may include macro permissions over sets and/or categories of electronic files and micro permissions related to an individual electronic file. User accounts may be used for senders and/or receivers in system 10.

User module 28 may be configured to obtain access authorization from users, including senders and/or receivers. Obtaining access authorization may require one or more of a user account, a user name and/or user identifier, security login information, an access code, password, key-fob code, electronic token, security token, biometric information, proximity information, a radio frequency (RF) token, and/or other ways to supply information that may be used to authorize access to a system in an attempt to keep that system secure. Obtaining access authorization may include verifying that a retrieve request is received from the target file recipient as intended in the pertinent share request. For example, such verification may be based on an association stored by cloud identifier module 27.

Cloud interface module 26 of virtualized server 11 may be configured to generate and/or present graphical user interfaces for display on client computing platforms. The graphical user interfaces may be configured to facilitate interaction between the client computing platforms and virtualized server 11. Cloud interface module 26 may be used by senders and/or receivers. For example, a graphical user interface for a sender may facilitate the exchange of share requests. A graphical user interface for a receiver may facilitate the exchange of notifications, retrieve requests, and/or access to transmitted copies of electronic files that were intended to be shared with the receiver.

Figure 2:
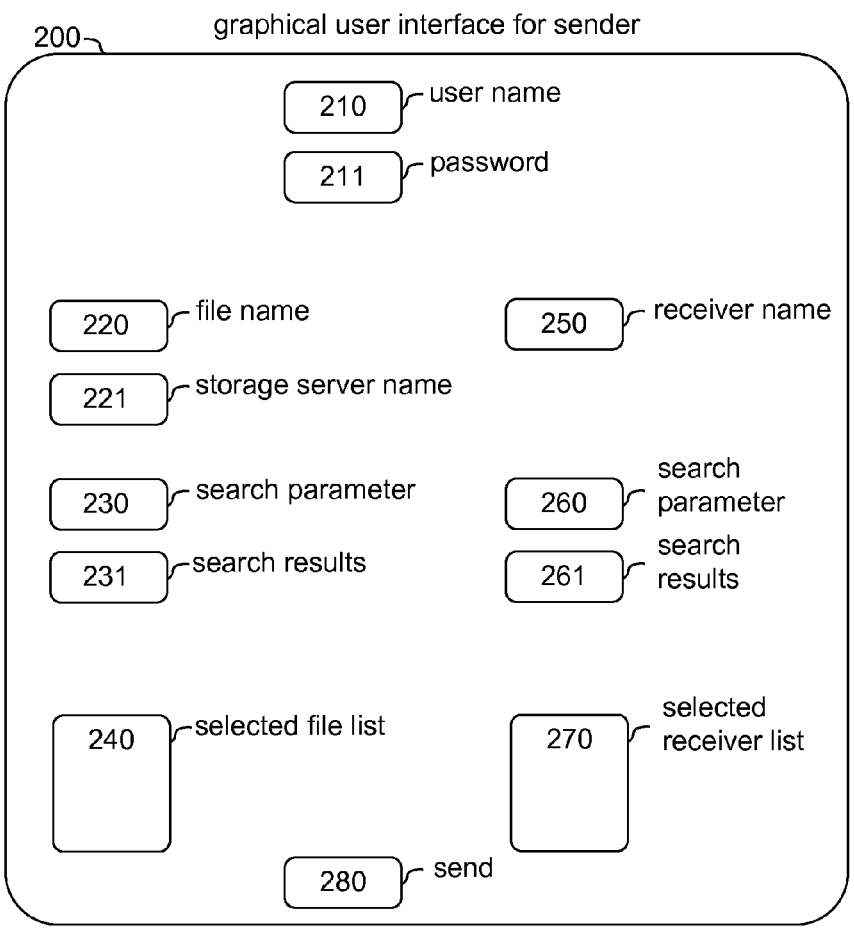
FIG. 2 illustrates a user interface that may be used by a sender to securely share electronic files.

By way of illustration, FIG. 2 illustrates a graphical user interface 200 that may be used by a sender to securely share electronic files. For the purpose of describing an exemplary implementation of a graphical user interface in this disclosure, graphical user interface 200 in FIG. 2 may be presented to a first user of the system. The first user may be referred to as the sender. Presentation of graphical user interface 200 to the sender may be accomplished through a client computing platform that is associated with the sender. Graphical user interface 200 includes multiple interface elements, including input elements 210, 211, 220, 221, 230, 250, and 260, output elements 231, 240, 261, and 270, and action element 280. In some implementations, graphical user interface 200 may be generated and/or presented by cloud interface module 26 (shown in FIG. 1 and described above).

Returning to FIG. 2, elements of graphical user interface 200 may be implemented as fields configured to receive entry, selection, and/or confirmation from a user, e.g. from the sender. The fields may include one or more of a text entry field, a set of selectable (menu) items, a selectable field, and/or other fields configured to receive entry, selection, and/or confirmation from the sender. Input element 210 may be used to enter a user identifier that identifies a user of the system and/or graphical user interface, e.g. through a user name. In some implementations, input element 210 may include text entry that may be used to filter and/or search through a set of user identifiers for selection. Input element 211 may be used to enter access authorization that authorizes access for the sender associated with the user identifier in input element 210, e.g. through a password. Input element 211 may include text entry.

Input element 220 may be used to enter a file identifier that identifies an electronic file to be shared, e.g. through a file name. In some implementations, input element 220 may provide access to a file browser to facilitate finding a particular electronic file on one or more file systems that are accessible from the client computing platform of the sender. Input element 221 may be used to enter a storage identifier that identifies electronic storage where the electronic file associated with the file identifier in input element 220 is stored, e.g. through a storage server name. In some implementations, input element 221 may not be needed, for example in cases where a particular storage server may be associated with a particular user and/or a particular user account. In some implementations, the particular electronic file to be shared may be stored on a client computing platform associated with the sender. Through graphical user interface 200, the sender may select such an electronic file and imply a request to upload this electronic file to a storage server 16.

Responsive to the sender providing and/or selecting a particular electronic file through input elements 220 and/or 221, the particular electronic file may be added to output element 240, a selected file list. Alternatively and/or simultaneously to using input elements 220 and 221, the sender may use input element 230 and output element 231. Input element 230 may be used to enter a search parameter to facilitate finding electronic files on the one or more file systems that are accessible from the client computing platform of the sender. The search results, responsive to using the search parameter, may be presented in output element 231, e.g. as a list of electronic files. The sender may select one or more electronic files from output element 231 and add them to output element 240, e.g. by dragging and dropping. Note that the selected file list may include multiple electronic files that are selected by the sender to be shared.

Input element 250 may be used to enter a user identifier that identifies a target file recipient for the one or more electronic files in selected file list 240, e.g. through a receiver name and/or an email address for the receiver. In some implementations, input element 250 may include text entry that may be used to filter and/or search through a set of user identifiers for selection. Responsive to the sender providing and/or selecting a particular receiver through input elements 250, the particular receiver may be added to output element 270, a selected receiver list. Alternatively and/or simultaneously to using input element 250, the sender may use input element 260 and output element 261. Input element 260 may be used to enter a search parameter to facilitate finding prospective receivers. The search results, responsive to using the search parameter, may be presented in output element 261, e.g. as a list of receiver names. The sender may select one or 270, e.g. by dragging and dropping. Note that the selected receiver list may include multiple receivers that are selected by the sender to receiver one or more selected electronic files.

Action element 280 may be a selectable field in graphical user interface 200 which triggers, upon selection by the sender, a confirmation from the sender that the selected list of electronic files in output element 240 is intended to be shared with the selected list of receivers in output element 270. Electronic files in the selected list of electronic files that are not yet stored in storage servers may, upon selection of action element 280 by the sender, be uploaded to one or more storage servers as described elsewhere herein.

Figure 3:
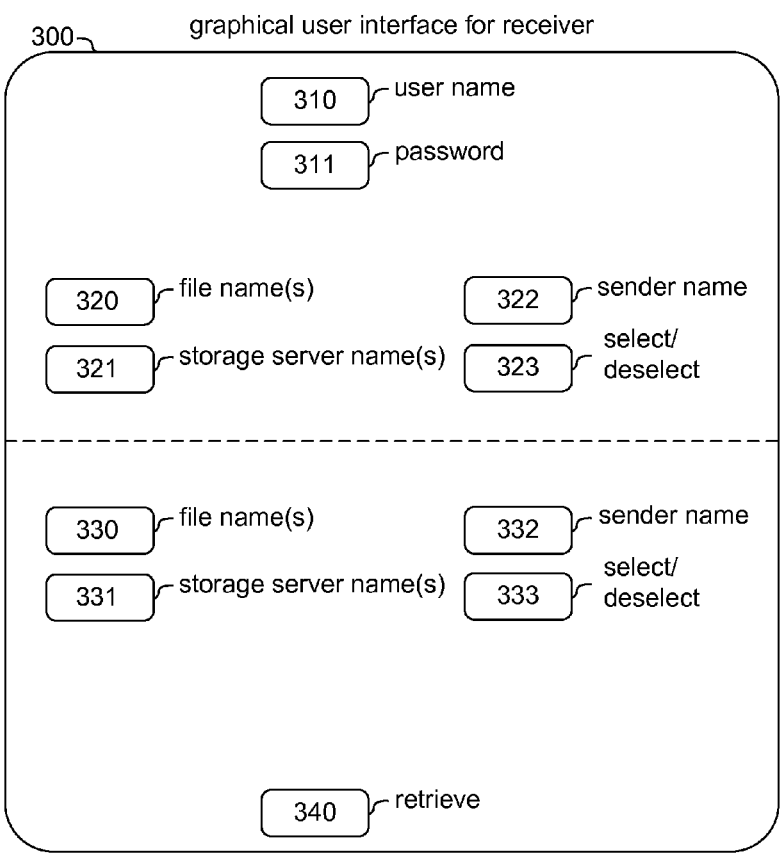
FIG. 3 illustrates a user interface that may be used by a receiver to retrieve electronic files that are securely shared.

By way of illustration, FIG. 3 illustrates a graphical user interface 300 that may be used by a receiver to retrieve electronic files that are securely shared by a sender. For the purpose of describing an exemplary implementation of a graphical user interface in this disclosure, graphical user interface 300 in FIG. 3 may be presented to a first receiver of the system. The first receiver may be referred to as the receiver. Presentation of graphical user interface 300 to the receiver may be accomplished through a client computing platform that is associated with the receiver. Graphical user interface 300 includes multiple interface elements, including input elements 310 and 311, output elements 320, 321, 322, 330, 331, and 332, and action elements 323, 333, and 340. In some implementations, graphical user interface 300 may be generated and/or presented by cloud interface module 26 (shown in FIG. 1 and described above, e.g. in relation to a receiver using a universal resource locator that is included in a notification provided by notification module 23).

Returning to FIG. 3, elements of graphical user interface 300 may be implemented as fields configured to receive entry, selection, and/or confirmation from a user, e.g. from the receiver. The fields may include one or more of a text entry field, a set of selectable (menu) items, a selectable field, and/or other fields configured to receive entry, selection, and/or confirmation from the receiver. Input element 310 may be used to enter a user identifier that identifies a user of the system and/or graphical user interface, e.g. through a user name. In some implementations, input element 310 may include text entry that may be used to filter and/or search through a set of user identifiers for selection. Input element 311 may be used to enter access authorization that authorizes access for the receiver associated with the user identifier in input element 310, e.g. through a password. Input element 311 may include text entry.

Output element 320 may be used to present a file identifier that identifies an electronic file to be shared, e.g. through a file name. Output element 321 may be used to present a storage identifier that identifies electronic storage where the electronic file associated with the file identifier from output element 320 is stored, e.g. through a storage server name. In some implementations, output element 321 may not be needed, for example in cases where a particular storage server may be associated with a particular user and/or a particular user account. Output element 322 may be used to present a user identifier that identifies the sender, e.g. through the sender name. The receiver may select and/or deselect the electronic file of output element 320 for retrieval through action element 323, which may toggle between selection and deselection when used by the receiver.

Output element 330 may be used to present a file identifier that identifies a second electronic file to be shared, e.g. through a file name. Output element 331 may be used to present a storage identifier that identifies electronic storage where the electronic file associated with the file identifier from output element 330 is stored, e.g. through a storage server name. In some implementations, output element 331 may not be needed, for example in cases where a particular storage server may be associated with a particular user and/or a particular user account. Output element 332 may be used to present a user identifier that identifies the sender, e.g. through the sender name. Note that the sender of electronic file 320 may be different than the sender of electronic file 330. The receiver may select and/or deselect the electronic file of output element 330 for retrieval through action element 333, which may toggle between selection and deselection when used by the receiver.

Action element 340 may be a selectable field in graphical user interface 300 which triggers, upon selection by the receiver, a confirmation from the receiver that the selected electronic files are intended to be retrieved.

Returning to FIG. 1, one or more storage servers 16 may be private storage servers that are managed and accessed independently form virtualized server 11. Storage servers 16 may include electronic storage 62, computer program modules, and/or other components. The computer program modules may include storage module 30, interface module 32, and/or other modules. One or more storage servers 16 may be used to store electronic files prior, during, and after secure file sharing as described herein. A storage server 16 may be accessible through a client computing platform 14, e.g. for uploading and/or downloading of electronic files. A storage server 16 may securely bind with virtualized server 11, for example through interface module 32.

Storage module 30 of storage server 16 may be configured to manage access to electronic storage 62. For example, a sender may intend to share, with a receiver, a particular electronic file that is stored on a particular storage server 16, e.g. on electronic storage 62 of that particular storage server 16. By virtue of secure file sharing as described herein, in some implementations, the receiver may have access to the particular electronic file through a target computing platform 14 that has established communication with the particular storage server 16. In some implementations, a copy of the particular electronic file may be stored in a different storage server 16, e.g. on electronic storage 62 of that different storage server 16. The receiver may have access to that copy of the particular electronic file through a target computing platform 14 that has established communication with the different storage server 16.

Interface module 32 of storage server 16 may be configured to facilitate interaction between storage server 16 and one or more client computing platforms 14. Interface module 32 may further be configured to facilitate the exchange of information and/or instructions with virtualized server 11 pertaining to secure file sharing of electronic files stored in electronic storage 62. Note that the content of electronic files stored in electronic storage 62 may not actually be stored, received, and/or transmitted to virtualized server 11. Interface module 32 may be configured to receive instructions from, e.g., transfer instruction module 25 to upload one or more electronic files from a client computing platform 14 to electronic storage 62.

One or more processors 20 may be configured to provide information processing capabilities in system 10. As such, processor 20 may include one or more of a digital processor, an analog processor, a digital circuit designed to process information, an analog circuit designed to process information, a state machine, and/or other mechanisms for electronically processing information. Although processor 20 may be shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination (e.g., "in the cloud", and/or other virtualized processing solutions).

It should be appreciated that although modules 22-28, are illustrated in FIG. 1 as being co-located within a single processing unit, in implementations in which processor 20 includes multiple processing units, one or more of modules 22-28 may be located remotely from the other modules. The description of the functionality provided by the different modules 22-28 described herein is for illustrative purposes, and is not intended to be limiting, as any of modules 22-28 may provide more or less functionality than is described. For example, one or more of modules 22-28 may be eliminated, and some or all of its functionality may be provided by other ones of modules 22-28. As another example, processor 20 may be configured to execute one or more additional modules that may perform some or all of the functionality attributed below to one of modules 22-28.

Electronic storage 60 and 62 of system 10 in FIG. 1 may comprise electronic storage media that stores information. The electronic storage media of electronic storage 60 and 62 may include one or both of system storage that is provided integrally (i.e., substantially non-removable) with system 10 and/or removable storage that is removably connectable to system 10 via, for example, a port (e.g., a USB port, a FireWire™ port, etc.) or a drive (e.g., a disk drive, etc.). Electronic storage 60 and 62 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), network-attached storage (NAS), and/or other electronically readable storage media. Electronic storage 60 may include virtual storage resources, such as storage resources provided via a cloud and/or a virtual private network. Electronic storage 60 and 62 may store software algorithms, information determined by processor 20, information received via client computing platforms 14, and/or other information that enables system 10 to function properly. Electronic storage 60 and 62 may be separate components within system 10, or electronic storage 60 and 62 may be provided integrally with one or more other components of system 10 (e.g., processor 20).

Figure 4:
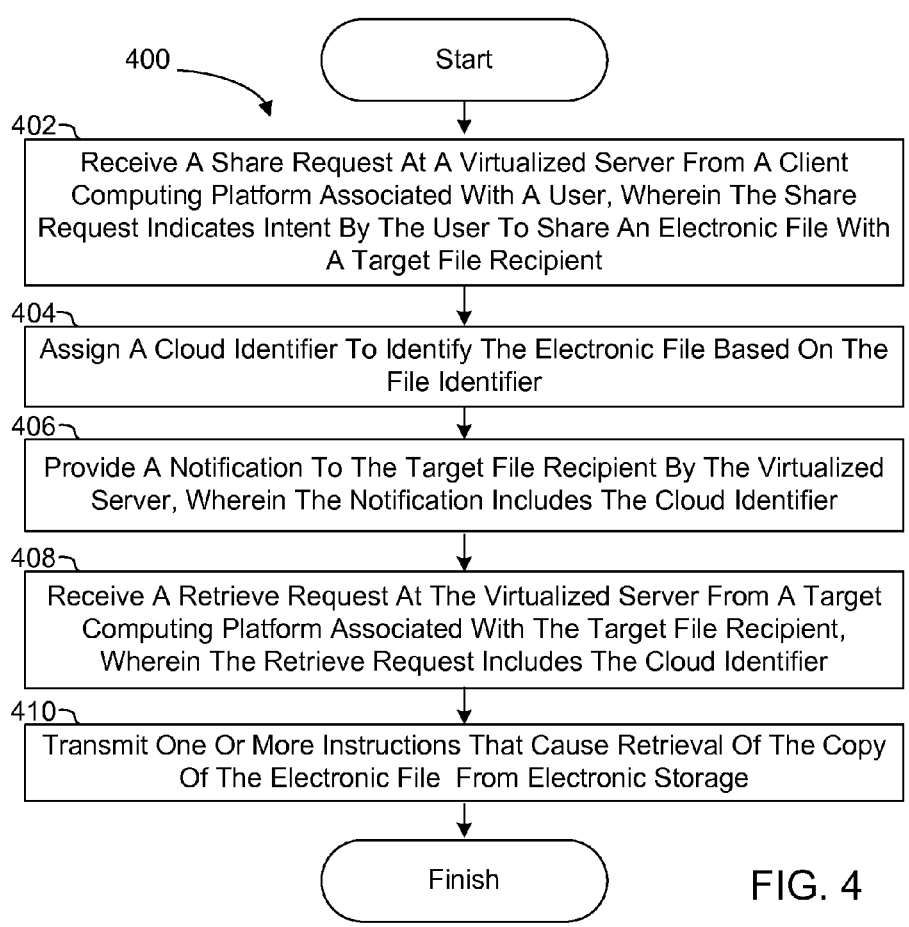
FIG. 4 illustrates a cloud-based method for securely sharing electronic files in accordance with one or more implementations.

FIG. 4 illustrates a cloud-based method 400 for securely sharing electronic files using a plurality of server platforms cooperating to implement a virtualized server. At an operation 402, a share request may be received at the virtualized server. The share request may be received from a client computing platform that is associated with a user. The share request may include a file identifier, a storage identifier, and a user identifier that identifies a target file recipient. The file identifier may identify an electronic file stored using electronic storage that is identified by the storage identifier. The electronic storage may be managed and accessed independently from the virtualized server. The share request may indicate intent by the user to share the electronic file with the target recipient. In some implementations, operation 402 may be performed by a share request module that is the same as or similar to share request module 22 (shown in FIG. 1 and described herein).

At an operation 404, a cloud identifier to identify the electronic file may be assigned. The cloud identifier may be based on one or more of the file identifier, and/or the storage identifier. In some implementations, operation 404 may be performed by a cloud identifier module that is the same as or similar to cloud identifier module 27 (shown in FIG. 1 and described herein).

At an operation 406, a notification is provided to the target file recipient by the virtualized server. The notification may indicate intent by the user to share the electronic file. The notification may include the cloud identifier. In some implementations, operation 406 may be performed by a notification module that is the same as or similar to notification module 23 (shown in FIG. 1 and described herein).

At an operation 408, a retrieve request is received at the virtualized server. The retrieve request may be received from a target computing platform that is associated with the target file recipient. The retrieve request may include the cloud identifier. The retrieve request may indicate intent by the target file recipient to receive a copy of the electronic file identified by the cloud identifier. In some implementations, operation 408 may be performed by a retrieve request module that is the same as or similar to retrieve request module 24 (shown in FIG. 1 and described herein).

At an operation 410, one or more instructions are transmitted that cause retrieval of a copy of the electronic file from the electronic storage. The copy of the electronic file may be retrieved independently from the virtualized server. In some implementations, operation 406 may be performed by a notification module that is the same as or similar to transfer instruction module 25 (shown in FIG. 1 and described herein).

Figure 5:
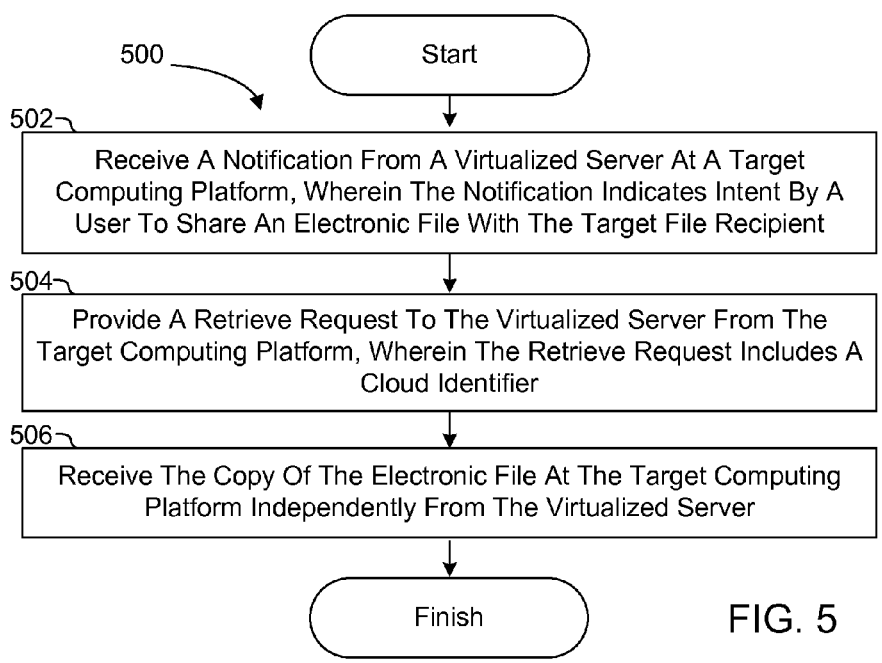
FIG. 5 illustrates a cloud-based method for securely sharing electronic files in accordance with one or more implementations.

FIG. 5 illustrates a cloud-based method 500 for securely sharing electronic files using a plurality of server platforms cooperating to implement a virtualized server. At an operation 502, a notification is received from the virtualized server at a target computing platform. The target computing platform may be associated with a target file recipient. The notification may indicate intent by a user to share an electronic file with the target file recipient. The notification may include a cloud identifier. The cloud identifier may identify the electronic file based on one or more of a file identifier, and/or a storage identifier. The file identifier may identify the electronic file stored using electronic storage that is identified by the storage identifier. In some implementations, operation 502 may be performed by a client computing platform and/or interface module that are the same as or similar to client computing platform 14 and/or interface module 32 (shown in FIG. 1 and described herein).

At an operation 504, the retrieve request is provided to the virtualized server from the target computing platform. The retrieve request may include the cloud identifier. The retrieve request may indicate intent by the target file recipient to receive a copy of the electronic file identified by the cloud identifier. In some implementations, operation 504 may be performed by a client computing platform and/or interface module that are the same as or similar to client computing platform 14 and/or interface module 32 (shown in FIG. 1 and described herein).

At an operation 506, the copy of the electronic file is received at the target computing platform. Operation 506 may be responsive to retrieval of the copy of the electronic file from the electronic storage that is identified by the storage identifier such that retrieval is independent from the virtualized server. In some implementations, operation 504 may be performed by a client computing platform and/or interface module that are the same as or similar to client computing platform 14 and/or storage module 30 (shown in FIG. 1 and described herein).

Figure 6:
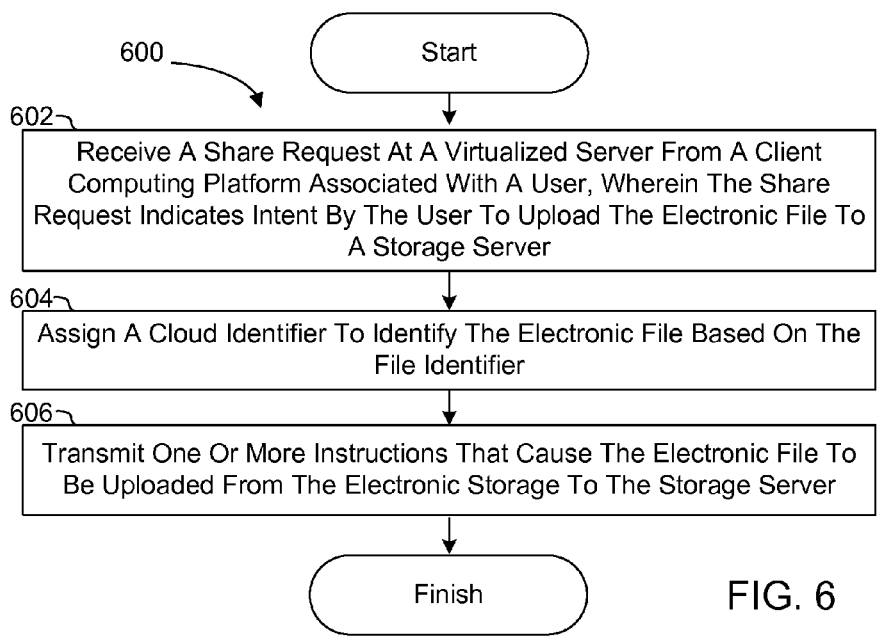
FIG. 6 illustrates a cloud-based method for securely sharing electronic files in accordance with one or more implementations.

FIG. 6 illustrates a cloud-based method 600 for securely sharing electronic files using a plurality of server platforms cooperating to implement a virtualized server. At an operation 602, a share request may be received at the virtualized server. The share request may be received from a client computing platform that is associated with a user. The share request may include a file identifier. The file identifier may identify an electronic file stored using electronic storage that is accessible from the client computing platform. The share request may indicate intent by the user to upload the electronic file to a storage server. In some implementations, operation 602 may be performed by a share request module that is the same as or similar to share request module 22 (shown in FIG. 1 and described herein).

At an operation 604, a cloud identifier to identify the electronic file may be assigned. The cloud identifier may be based on the file identifier. In some implementations, operation 604 may be performed by a cloud identifier module that is the same as or similar to cloud identifier module 27 (shown in FIG. 1 and described herein).

At an operation 608, one or more instructions are transmitted that cause the electronic file to be uploaded from the electronic storage to the storage server. In some implementations, operation 608 may be performed by a notification module that is the same as or similar to transfer instruction module 25 (shown in FIG. 1 and described herein).

The operations of methods 400, 500, and 600 presented herein are intended to be illustrative. In some embodiments, one or more of methods 400, 500, and 600 may be accomplished with one or more additional operations not described, and/or without one or more of the operations discussed. Additionally, the order in which the operations of methods 400, 500, and 600 are illustrated in FIG. 4, FIG. 5, and FIG. 6 and described herein is not intended to be limiting.

In some embodiments, one or more of methods 400, 500, and 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of one or more of methods 400, 500, and 600 in response to instructions stored electronically on an electronic storage medium. The one or more processing devices may include one or more devices configured through hardware, firmware, and/or software to be specifically designed for execution of one or more of the operations of one or more of methods 400, 500, and 600.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A cloud-based method of securely sharing electronic files using a plurality of server platforms cooperating to implement a virtualized server, the method comprising:

receiving a share request at the virtualized server from a client computing platform associated with a user, wherein the share request includes a file identifier, a target user identifier that identifies a target file recipient, wherein the file identifier identifies an electronic file stored using electronic storage, wherein the electronic storage is managed and accessed independently from the virtualized server through a storage server, wherein the storage server is a private storage server that is associated with the user and uses one or more types of access control, wherein the share request indicates intent by the user to share the electronic file with the target file recipient, and wherein the virtualized server uses one or more types of access control that are independent from the one or more types of access control used by the private storage server;

assigning, at the virtualized server, a cloud identifier to identify the electronic file based on the file identifier, wherein assigning the cloud identifier includes storing an association between the cloud identifier and the target user identifier;

providing a notification to the target file recipient by the virtualized server, wherein the notification indicates intent by the user to share the electronic file, and wherein the notification includes the cloud identifier;

receiving a retrieve request at the virtualized server from a target computing platform associated with the target file recipient, wherein the retrieve request includes the cloud identifier, and wherein the retrieve request indicates intent by the target file recipient to receive a copy of the electronic file identified by the cloud identifier;

verifying that the retrieve request is received from the target file recipient as intended in the share request, wherein verification is based on the stored association between the cloud identifier and the target user identifier; and transmitting one or more instructions from the virtualized server to the storage server that cause retrieval of the copy of the electronic file from the storage server and transmission of the copy of the electronic file to the target computing platform such that the copy of the electronic file is neither stored on the virtualized server nor transmitted through the virtualized server.

2. The cloud-based method of claim 1, wherein an instance of the virtualized server is deployed via a collection of web services hosted by a third party.

3. The cloud-based method of claim 1, wherein the file identifier either includes or is based on a file name.

4. The cloud-based method of claim 1, further comprising:
generating a client user interface for display on the client computing platform; and
facilitating interaction through the client user interface between the client computing platform and the virtualized server.

5. The cloud-based method of claim 1, further comprising:
generating a target interface for display on the target computing platform; and
facilitating interaction through the target interface between the target computing platform and the virtualized server.

6. The cloud-based method of claim 1, wherein the target user identifier includes an email address, and wherein providing a notification to the target file recipient includes sending an electronic message to the email address.

7. The cloud-based method of claim 6, wherein the electronic message includes a resource locator, wherein the resource locator provides access via the virtualized server to a retrieve request interface.

8. The cloud-based method of claim 7, wherein receiving the retrieve request at the virtualized server is accomplished through the retrieve request interface.

9. The cloud-based method of claim 1, further comprising:
identifying a user account associated with the user.

10. The cloud-based method of claim 9, further comprising:
obtaining access authorization from the user.

11. The cloud-based method of claim 1, further comprising:
obtaining access authorization from the target file recipient.

12. The cloud-based method of claim 1, further comprising:
obtaining access authorization from the target file recipient,
wherein obtaining access authorization from the target file recipient includes verifying that the retrieve request is received from the target file recipient as intended in the share request, wherein the verification is based on the stored association.

13. The cloud-based method of claim 1, wherein the electronic file is not stored or transmitted by the virtualized server.

14. The cloud-based method of claim 1, wherein retrieval of the copy of the electronic file comprises:

transmitting the copy of the electronic file to the target computing platform such that, upon transmission of the copy of the electronic file, the target file recipient has access to the transmitted copy of the electronic file through the target computing platform.

15. The cloud-based method of claim 14, wherein the transmitted one or more instructions that cause retrieval of the copy of the electronic file include a specification of access rights for the copy of the electronic file, and wherein, upon transmission of the copy of the electronic file, the transmitted copy of the electronic file includes access rights in accordance with the specification of access rights.

16. The cloud-based method of claim 1, wherein a second electronic storage is managed and accessed independently from the virtualized server through a second storage server, wherein the second storage server is a second private storage server that is associated with the target file recipient, wherein the second storage server is accessible to the target file recipient through the target computing platform, wherein retrieval of the copy of the electronic file comprises:

transmitting the copy of the electronic file to the second storage server such that the target file recipient has access to the transmitted copy of the electronic file through the target computing platform.

17. The cloud-based method of claim 16, wherein transmitting the one or more instructions that cause the electronic file to be transmitted to the second storage server includes transmitting one or more instructions to at least one of the client computing platform, the electronic storage, the storage server, and the second storage server.

18. A cloud-based system configured to securely share electronic files, the system comprising:

a storage server configured to provide electronic storage, wherein the storage server is a private storage server that is associated with a user and that uses one or more types of access control; and processors included in a plurality of server platforms cooperating to implement a virtualized server, the virtualized server comprising:

a share request module configured to receive a share request at the virtualized server from a client computing platform associated with the user, wherein the share request includes a file identifier and a target user identifier that identifies a target file recipient, wherein the file identifier identifies an electronic file stored using electronic storage, wherein the electronic storage is managed and accessed independently from the virtualized server through the storage server, wherein the share request indicates intent by the user to share the electronic file with the target file recipient, and wherein the virtualized server uses one or more types of access control that are independent from the one or more types of access control used by the private storage server;

a cloud identifier module configured to assign a cloud identifier to identify the electronic file based on the file identifier, wherein the cloud identifier module is further configured to store an association between the cloud identifier and the target user identifier;

a notification module configured to provide a notification to the target file recipient, wherein the notification indicates intent by the user to share the electronic file, and wherein the notification includes the cloud identifier;

a retrieve request module configured to receive a retrieve request from a target computing platform associated with the target file recipient, wherein the retrieve request includes the cloud identifier, and wherein the retrieve request indicates intent by the target file recipient to receive a copy of the electronic file identified by the cloud identifier, wherein the retrieve request module is further configured to verify that the retrieve request is received from the target file recipient as intended in the share request, wherein verification is based on the stored association between the cloud identifier and the target user identifier; and a transfer instruction module configured to transmit one or more instructions from the virtualized server to the storage server that cause retrieval of a copy of the electronic file identified by the cloud identifier from the storage server and transmission of the copy of the electronic file to the target computing platform such that the copy of the electronic file is neither stored on the virtualized server nor transmitted through the virtualized server.

19. The cloud-based system of claim 18, wherein an instance of the virtualized server is deployed via a collection of web services hosted by a third party.

20. The cloud-based system of claim 18, wherein the file identifier either includes or is based on a file name.

21. The cloud-based system of claim 18, further comprising a cloud interface module configured to generate a client user interface for display on the client computing platform, wherein the user interface is configured to facilitate interaction between the client computing platform and the virtualized server.

22. The cloud-based system of claim 21, wherein the cloud interface module is further configured to generate a target interface for display on the target computing platform, wherein the target interface is configured to facilitate interaction between the target computing platform and the virtualized server.

23. The cloud-based system of claim 18, wherein the target user identifier includes an email address, and wherein the notification module is configured to provide the notification via an electronic message to the email address.

24. The cloud-based system of claim 23, wherein the electronic message includes a resource locator, wherein the resource locator provides access via the virtualized server to a retrieve request interface.

25. The cloud-based system of claim 24, wherein the retrieve request module is configured to receive the retrieve request via the retrieve request interface.

26. The cloud-based system of claim 18, further comprising a user module configured to identify a user account associated with the user.

27. The cloud-based system of claim 26, wherein the user module is further configured to obtain access authorization from the user.

28. The cloud-based system of claim 27, wherein the user module is further configured to obtain access authorization from the target file recipient.

29. The cloud-based system of claim 18, further comprising a user module configured to obtain access authorization from the target file recipient, wherein obtaining access authorization from the target file recipient includes verifying that the retrieve request is received from the target file recipient as intended in the share request, wherein the verification is based on the stored association.

30. The cloud-based system of claim 18, wherein the electronic file is not stored or transmitted by the virtualized server.

31. The cloud-based system of claim 18, wherein retrieval of the copy of the electronic file includes a transmission of the copy of the electronic file to the target computing platform such that the target file recipient has access to the transmitted copy of the electronic file through the target computing platform.

32. The cloud-based system of claim 31, wherein the transmitted one or more instructions that cause retrieval of the copy of the electronic file include a specification of access rights for the copy of the electronic file, and wherein, upon transmission of the copy of the electronic file, the transmitted copy of the electronic file includes access rights in accordance with the specification of access rights.

33. The cloud-based system of claim 30, wherein the electronic storage used to store the electronic file is accessible from the client computing platform, and wherein the transfer instruction module is further configured to, responsive to reception of the share request, transmit one or more instructions that cause the electronic file to be transferred from the electronic storage to the storage server.

34. The cloud-based system of claim 18, further comprising:

a second storage server configured to provide a second electronic storage that is managed and accessed independently from the virtualized server, wherein the second storage server is a second private storage server that is associated with the target recipient, wherein the second storage server is accessible to the target file recipient through the target computing platform, wherein the transfer instruction module is further configured to transmit the copy of the electronic file to the second storage server such that the target file recipient has access to the transmitted copy of the electronic file through the target computing platform.

* * * * *